(12) United States Patent
Francis et al.

(10) Patent No.: US 7,431,537 B2
(45) Date of Patent: Oct. 7, 2008

(54) HIGH CAPACITY PARTICULATE LOADER AND TRANSFER APPARATUS

(75) Inventors: Lane Francis, Swift Current (CA); Bob Sonntag, Swift Current (CA); Frank Rempel, Swift Current (CA); Max Noble, Swift Current (CA); Jody Duclos, Swift Current (CA)

(73) Assignee: REM Enterprises, Inc., Swift Current, Saskatchewan (CA)

( * ) Notice: Subject to any disclaimer, the term of this patent is extended or adjusted under 35 U.S.C. 154(b) by 42 days.

(21) Appl. No.: 11/423,429

(22) Filed: Jun. 9, 2006

(65) Prior Publication Data
US 2007/0269276 A1 Nov. 22, 2007

(30) Foreign Application Priority Data
May 17, 2006 (CA) .................................. 2547163

(51) Int. Cl.
*B65G 53/08* (2006.01)
(52) U.S. Cl. .............................. 406/53; 406/38; 406/39; 406/151; 406/152; 406/168
(58) Field of Classification Search .................. 406/28, 406/38, 39, 40, 41, 42, 43, 44, 53, 151, 152, 406/153, 168, 173
See application file for complete search history.

(56) References Cited

U.S. PATENT DOCUMENTS

| | | | | |
|---|---|---|---|---|
| 4,111,670 A * | 9/1978 | DeMarco | ...................... | 55/315 |
| 4,344,723 A * | 8/1982 | Ellingson | ...................... | 406/53 |
| 4,478,517 A | 10/1984 | Hoppe et al. | | |
| 4,632,565 A | 12/1986 | Mahoney, Jr. | | |
| 4,662,800 A * | 5/1987 | Anderson et al. | .............. | 406/53 |
| 4,822,430 A * | 4/1989 | Carberry | ...................... | 134/21 |
| 4,874,410 A * | 10/1989 | Poor | ........................... | 96/382 |
| 4,881,855 A * | 11/1989 | Rempel et al. | ................. | 406/53 |
| 4,907,892 A | 3/1990 | Paul | | |
| 5,015,274 A * | 5/1991 | Perry | ........................... | 95/278 |
| 5,092,267 A * | 3/1992 | Hajek | .......................... | 118/694 |
| 5,163,786 A * | 11/1992 | Christianson | ................. | 406/41 |
| 5,226,938 A * | 7/1993 | Bailey et al. | ................... | 55/305 |
| 5,341,856 A * | 8/1994 | Appenzeller | .................. | 141/67 |
| 5,428,864 A * | 7/1995 | Pemberton | .................... | 15/348 |
| 5,575,596 A * | 11/1996 | Bauer et al. | .................. | 406/168 |
| 6,110,242 A * | 8/2000 | Young | .......................... | 55/337 |
| 6,223,387 B1 * | 5/2001 | Anderson | ................... | 15/340.1 |
| 6,332,239 B1 * | 12/2001 | Dubos et al. | ................... | 15/353 |
| 6,523,721 B1 * | 2/2003 | Nomoto et al. | ................ | 222/77 |

(Continued)

*Primary Examiner*—Douglas A Hess
(74) *Attorney, Agent, or Firm*—Myers Wolin, LLC

(57) ABSTRACT

A high capacity particulate loader having an intake hose on one sidewall thereof which communicates with a source of negative pressure formed by a multi-stage suction mechanism, to create a high suction, high volume and high speed air stream that draws particulate materials through the hose and propels them into a separation chamber where they separate from the air stream and are directed into a discharge auger assembly on the opposite sidewall of the loader. The multi-stage suction mechanism communicates with a separation chamber and/or a settling chamber, the settling chamber providing an area where dust or fine chaff from the suctioned particulate materials, which may be present in the air stream, can settle, through gravity, on a bottom surface of the settling chamber, thus avoiding contact with the blowers so as to prevent clogging of the blowers and rotor wear thereof.

17 Claims, 15 Drawing Sheets

U.S. PATENT DOCUMENTS 6,634,833 B2 * 10/2003 Gillespie ..................... 406/84
6,659,284 B2 * 12/2003 McCray ..................... 209/147
6,974,279 B2 * 12/2005 Morohashi et al. .......... 406/173
7,278,804 B2 * 10/2007 Deal et al. ................. 406/197

* cited by examiner

HIGH CAPACITY PARTICULATE LOADER AND TRANSFER APPARATUS

FIELD OF THE INVENTION

This invention relates to the field of bulk transfer machines for grain, particulates and granular materials (hereinafter referred to as "particulates") and, more particularly, to an improved, highly efficient portable unit useable by farmers and others to move and handle particulates.

DESCRIPTION OF THE PRIOR ART

Grain and fertilizer collector machines have been commercialized for many years, and represent the underlying technology over which the present invention is a significant improvement. Previous prior art machines have been subject to certain shortcomings which have been overcome in the present invention.

For example, some prior art machines utilize a single stage fan or blower to create suction for the vacuum pickup of the granular or particulate materials, in a negative pressure system. The prior art, although quite satisfactory from a functional standpoint, have limitations in their application when compared to the present invention, and do not provide an acceptably high operating capacity given the fact that these solely use a single stage blower for generating suction or negative pressure for operating such a machine. Further such machines allow for particulate materials, when the vacuum-generated pickup air stream is drawn through the loader, to come into contact with the rotors of the blower, which permits possible clogging of the blower and/or rotor wear thereof, which, through repeated prolonged contact, can limit or reduce the life span of such blowers or rotors.

In addition, prior auger assemblies for such grain and fertilizer collector machines may include an elongated barrel or tube presenting a material inlet and a material outlet spaced from the inlet, with an elongated, axially rotatable, material-conveying auger screw positioned within the tube. Auger assemblies are often used for conveying materials such as granular agricultural products along a desired path of travel, for example, from the outlet of a grain cart to a collection hopper. In negative pressure systems, appropriate airlock doors, housings, and the like are provided for preserving the integrity of the overall negative pressure system, and to maintain the negative pressure within the loader.

However, two related problems have arisen in conventional loader auger air locks or housings. The first is that materials exiting from the outlet through the airlock doors generally allow, once the airlock door is opened for the discharge of materials, outside air to enter into the barrel or tube, which weakens the vacuum and suction effect. Conventional airlock doors, once opened, allow for materials to be discharged downwardly from the end of the discharge port, but also to be discharged and directed out to sides of the discharge port once exiting the auger assembly, thus allowing outside air to enter from the sides into the barrel or tube. The second further problem stems from the possibility, once outside air has entered into the barrel or tube of the auger assembly, that material being transported by the auger to be discharged can be blown back down the auger assembly, resulting in what is commonly known as "blowback". When this occurs, it is not uncommon for almost all of the vacuum effect to be lost or substantially reduced. It will thus be appreciated that both of these problems can impair the negative pressure conditions within the overall system. Hence, there is a real need for an improved, high efficiency auger airlock assembly and end dump housing which can maintain the vacuum suction created by the negative pressure, thereby assuring smooth, trouble-free operation.

Accordingly, there is a need for an improved high capacity particulate loader and transfer apparatus which utilizes an auger airlock assembly and end dump housing which, for materials exiting the auger assembly, limits the direction in which materials are to be discharged downwardly from the end of the discharge port, and limits the opportunity for outside air to enter the discharge port from the sides of the port upon the discharge of materials, thus preserving the integrity of the overall negative pressure system and maintaining the vacuum suction created by the negative pressure within the loader.

There is a further need for an improved high capacity particulate loader and transfer apparatus which utilizes a multi-stage suction mechanism for forming a source of negative pressure to create a high suction, high volume and high speed air stream that draws particulate materials into the loader and thus achieve a higher operating capacity. There is also a further need for an improved high capacity particulate loader and transfer apparatus utilizing a multi-stage suction mechanism, in communication with a separation chamber and in one embodiment, a settling chamber, the settling chamber providing an area where dust, fine chaff or other particles from the suctioned particulate or granular materials, which may be present in the air stream, can settle, through gravity, on a bottom surface of the settling chamber, thus reducing contact between particulates and the blowers so as to reduce clogging of the blowers and rotor wear thereof. In this regard, the present invention substantially fulfills this need.

SUMMARY OF THE INVENTION

Accordingly, one object of the present invention is to provide an improved high capacity particulate loader and transfer apparatus for use by farmers and others for loading grain and other particulate materials from, for example, bins and other storage structures into trucks, trailers, wagons, or other receptacles which provides a dramatic improvement over the prior art machines in terms of operating efficiency and capacity. Another object is to provide an improved high capacity particulate loader and transfer apparatus having a high efficiency auger airlock assembly and end dump housing which can maintain negative pressure within the auger assembly and loader.

Another object of the present invention is to provide an improved high capacity particulate loader and transfer apparatus which utilizes a multi-stage suction mechanism, comprised of at least two fan or centrifugal blowers connected in tandem, for creating a source of negative pressure, to create a high suction, high volume and high speed air stream that draws particulate materials into the loader and thus provide a higher operating capacity.

A still further object of the present invention is to provide an improved high capacity particulate loader and transfer apparatus utilizing a multi-stage suction mechanism as noted above, in communication with a separation chamber and a settling chamber, the settling chamber providing an area where dust, fine chaff or other particles from the suctioned particulate or granular materials, which may be present in the air stream, can settle, through gravity, on a surface of the settling chamber, this reducing contact between the particulates and the blowers so as to reduce clogging of the blowers and rotor wear thereof.

A still further object of the present invention is to provide an improved high capacity particulate loader and transfer apparatus which utilizes a variable speed auger, and which comprises a power transfer case for transferring power from a main drive shaft to an intermediate shaft which extends on an angle which corresponds with or substantially corresponds with the angle of the longitudinal axis of the auger to the horizontal. In this manner, regardless of the angle or positioning of the auger in relation to the loader, power to the auger, through use of a corresponding pulley or multi-pulley set linking the intermediate shaft to the lower end of the auger, can be simply and easily provided.

According to one aspect of the present invention, there is provided a high capacity bulk loader for particulate materials comprising a chassis adapted to be positioned adjacent materials to be loaded; a hollow body mounted on the chassis and defining an internal, air-materials separating chamber and a settling chamber therein; an inlet in a sidewall of the hollow body; a pickup conduit coupled with the inlet through which materials may be directed into the separating chamber; at least two fan blowers, operably interconnected in tandem to form a multi-stage suction mechanism, carried by the chassis and communicating with the separating chamber and the settling chamber for drawing a high powered air stream through the conduit to entrain the materials and propel them into the separating chamber through the inlet; an outlet in another sidewall of the body opposite the inlet; means within the separating chamber for allowing the air stream to escape through the separating chamber and the settling chamber, while the momentum of the materials propelled into the separating chamber carries the materials across a width of the separating chamber and charges them into the outlet; a discharge conveyor operably coupled with the outlet for transferring materials charged into the outlet to a remote location; and means for sealing the discharge conveyor against substantial entry of ambient air during operation of the discharge conveyor and the multi-stage suction mechanism to prevent significant diminution of a strength of the air stream created by the multi-stage suction mechanism.

According to another aspect of the present invention, there is provided a high capacity bulk loader for particulate materials comprising a chassis adapted to be positioned adjacent materials to be loaded; a hollow body mounted on the chassis and defining an internal, air-materials separating chamber therein; an inlet in a sidewall of the hollow body; a pickup conduit coupled with the inlet through which materials may be directed into the separating chamber; at least two fan blowers, operably interconnected in tandem to form a multi-stage suction mechanism, carried by the chassis and communicating with the separating chamber for drawing a high powered air stream through the conduit to entrain the materials and propel them into the separating chamber through the inlet; an outlet in another sidewall of the body opposite the inlet; separating means within the separating chamber for allowing the air stream to escape through the separating chamber, while the momentum of the materials propelled into the separating chamber carries the materials across a width of the separating chamber and charges them into the outlet; a discharge conveyor operably coupled with the outlet for transferring materials charged into the outlet to a remote location; and means for sealing the discharge conveyor against substantial entry of ambient air during operation of the discharge conveyor and the multi-stage suction mechanism to prevent significant diminution of a strength of the air stream created by the multi-stage suction mechanism.

According to another aspect of the present invention, there is provided a multi-stage suction mechanism for use in a bulk loader having a chassis, a substantially hollow body mounted on the chassis which defines an internal, air-materials separating chamber therein, and a pickup conduit coupled with an inlet of the chamber through which materials may be directed into the chamber, the multi-stage suction mechanism comprising at least two centrifugal blowers carried by the chassis and each having an air inlet and an air outlet, wherein the air outlet of a first centrifugal blower is operably connected to the air inlet of a second centrifugal blower, and the air outlet of the second centrifugal blower is connected to an outside exhaust, the operably connected first and the second centrifugal blowers forming the multi-stage suction mechanism for communicating with the chamber and for drawing a high powered air stream through the conduit to entrain the materials and propel them into the chamber through the inlet of the chamber.

A still further aspect of the present invention provides for a system for providing a multi-stage suction mechanism in a bulk loader having a chassis and a substantially hollow body mounted on the chassis which defines an internal, air-materials separating chamber therein, the system comprising the steps of providing a pickup conduit, the pickup conduit being coupled with an inlet of the chamber through which materials may be directed into the chamber; providing a settling chamber, the settling chamber being positioned between the separating chamber and the multi-stage suction mechanism; operably interconnecting at least two centrifugal blowers, in tandem, to form the multi-stage suction mechanism, the multi-stage suction mechanism being carried by the chassis, and communicating with the separation chamber and the settling chamber; operably interconnecting the multi-stage suction mechanism to an outside exhaust; and utilizing the multi-stage suction mechanism to draw a high powered air stream through the conduit to entrain the materials and propel them into the separation chamber through the inlet of the separation chamber.

The advantage of the present invention is that it provides an improved high capacity particulate loader and transfer apparatus for use by farmers and others for loading grain and other particulate materials from, for example, bins and other storage structures into trucks, trailers, wagons, or other receptacles which provides a dramatic improvement over prior art machines in terms of operating efficiency and capacity. Another advantage is to provide an improved high capacity particulate loader and transfer apparatus having a high efficiency auger airlock assembly and end dump housing which can maintain negative pressure within the auger assembly and loader.

A still further advantage of the present invention is that it provides an improved high capacity particulate loader and transfer apparatus utilizing a multi-stage suction mechanism for forming a greater source of negative pressure with which to create a high suction, high volume and high speed air stream that draws particulate materials into the loader and thus achieve a higher operating capacity.

Yet another advantage of the present invention is to provide an improved high capacity particulate loader and transfer apparatus utilizing a multi-stage suction mechanism as noted above, in communication with a separation chamber and a settling chamber, the settling chamber providing an area where dust, fine chaff or other particles from the suctioned particulate or granular materials, which may be present in the air stream, can settle, through gravity, on a surface of the settling chamber, thus reducing contact between particulates and the blowers so as to reduce clogging of the blowers and rotor wear thereof.

A still further advantage of the present invention is to provide an improved high capacity particulate loader and transfer apparatus which utilizes a variable speed auger, and which comprises a power transfer case for transferring power from a main drive shaft to an intermediate shaft which extends on an angle which corresponds with or substantially corresponds with the angle of the longitudinal axis of the auger to the horizontal. In this manner, regardless of the angle or positioning of the auger in relation to the loader, power to the auger, through use of a corresponding pulley or multi-pulley set linking the intermediate shaft to the lower end of the auger, can be simply and easily provided.

BRIEF DESCRIPTION OF THE DRAWINGS

A preferred embodiment of the present invention is described below with reference to the accompanying drawings, in which.

DESCRIPTION OF THE PREFERRED EMBODIMENT

Figure 1:
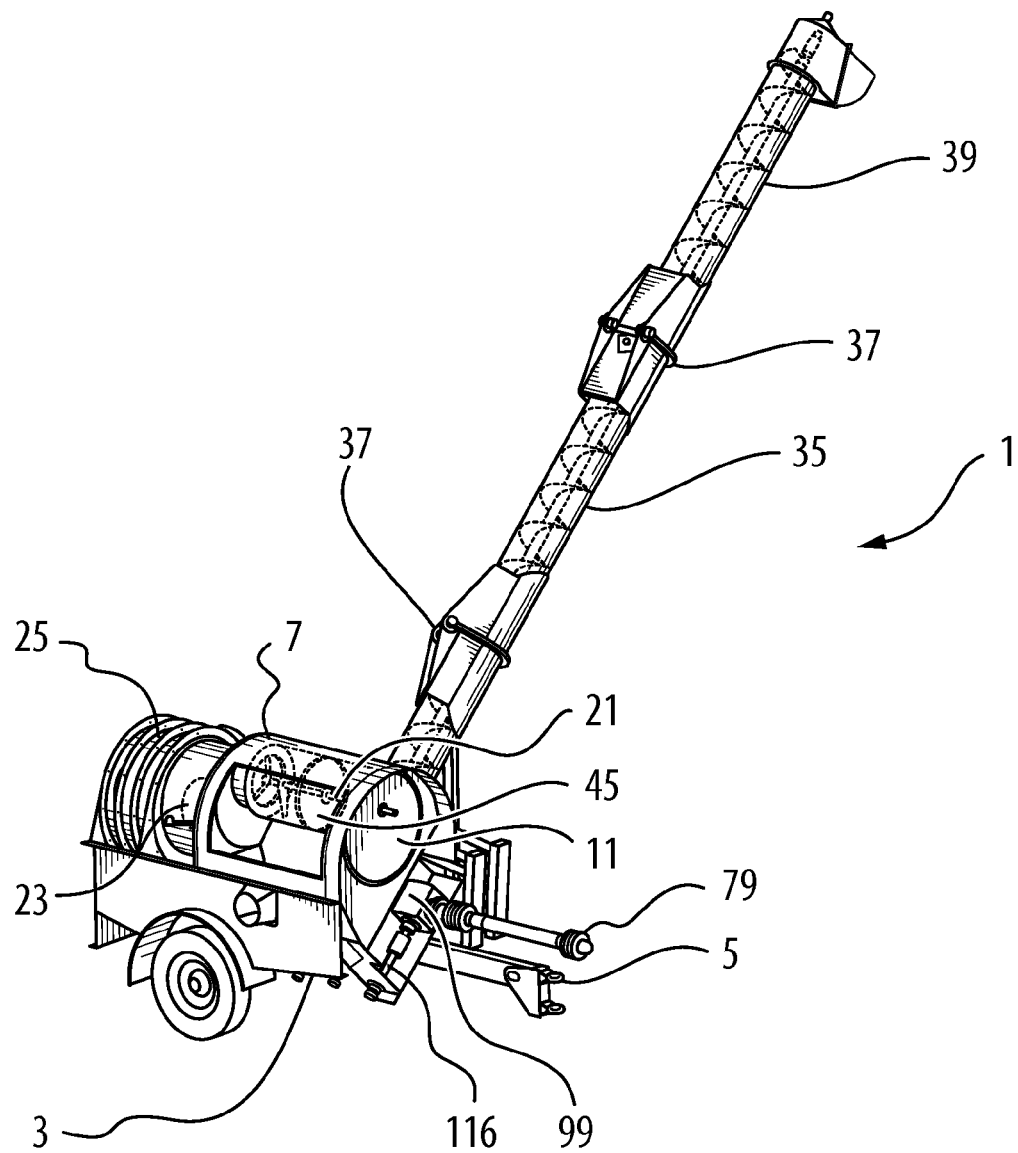
FIG. 1 is a right side view of an embodiment of the bulk loader of the present invention.

FIGS. 1 to 13 relate to a high capacity bulk loader 1 for grain, particulate or granular materials which incorporates the principles of the present invention, it being understood that grain, particulate or granular materials (hereinafter referred to as "particulates") can encompass, for example, grain or agricultural products, fertilizer, chemicals, or other small particulate matter such as styrofoam packing chips or material, glass beads, or other materials which would be apparent to a worker skilled in the art. As illustrated, in one embodiment, a loader 1 includes a wheeled chassis 3 having a forwardly extending tongue 5 by which the loader 1 may be coupled with a towing vehicle (not shown). In an alternative embodiment a non-wheeled, stationary chassis is provided, for permanent or long-term positioning and/or installation at a location, powered for example, by a gasoline or diesel engine or electric motor (not shown). For the purposes of clarity, in this description, the front of the loader is to be understood to be that end of the loader which would, during typical operation, face a tractor or other power take-off or drive mechanism, the right side of the loader being that side which in the preferred embodiment, has the inlet 19 therethrough (as described below), the left side of the loader being the side which has the auger 33 extending therefrom, and the rear of the loader being that side which is opposite the front.

Supported on the chassis 3 is an air-materials separating chamber 21, a settling chamber 23, and a multi-stage suction chamber 24 which houses a multi-stage suction mechanism 25, as hereinafter described, it being understood that, in an alternative embodiment, no settling chamber is utilized, the separating chamber 21 being connected directly, or by a conduit, to the multi-stage suction chamber.

Figure 3:
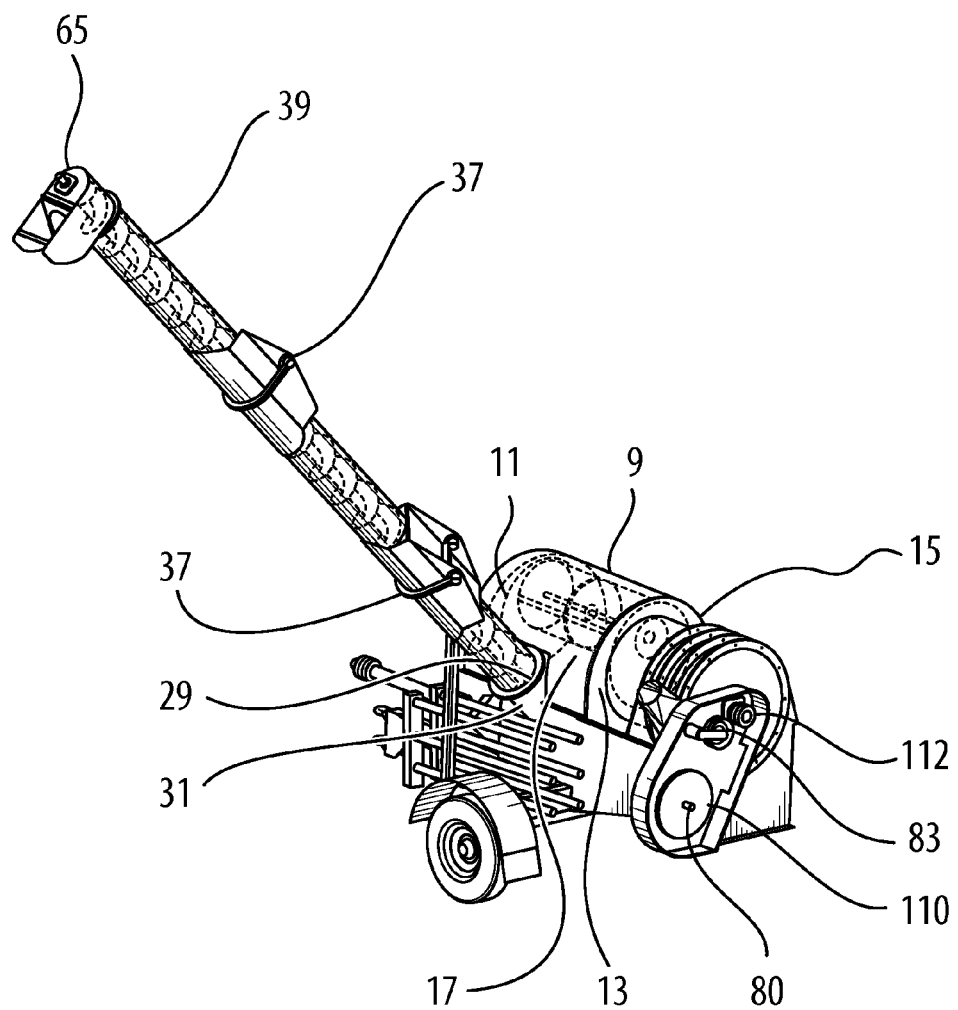
FIG. 3 is a back end elevational view of the embodiment of the bulk loader shown in FIG. 1.
Figure 7:
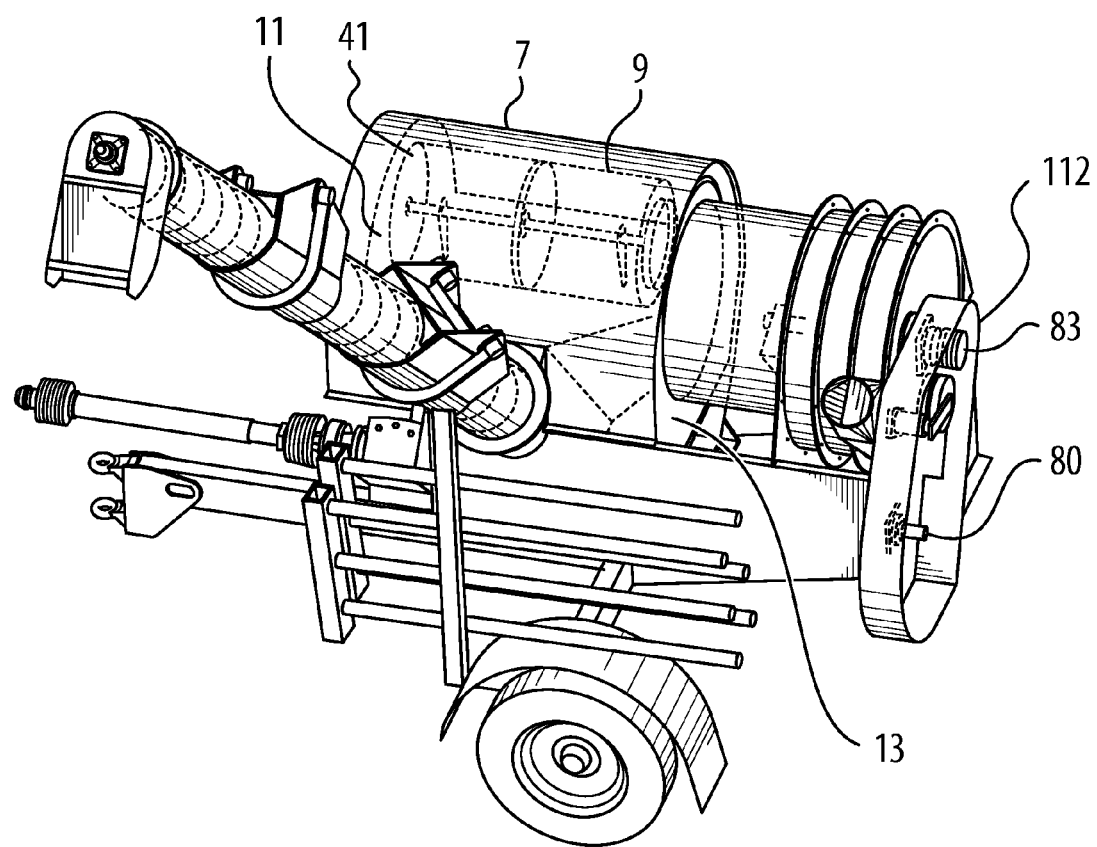
FIG. 7 is a rear perspective view of the embodiment of the bulk loader shown in FIG. 1.

In the preferred embodiment, the air-materials separating chamber 21 is generally cylindrical, having a generally semi-circular upper wall 9, as seen in FIG. 7. The air-materials separating chamber 21 is also provided with an upright front wall 11 and with a similarly upright rear wall 13, both of which span the distance between opposite sidewalls 15, 17 and the upper wall 9, as seen in FIG. 3. In an embodiment of the present invention, interior side surfaces of the air-materials separating chamber 21 (not shown) are inclined downwardly and inwardly, converging toward one another as the bottom of the air-materials separating chamber 21 is approached.

Figure 4:
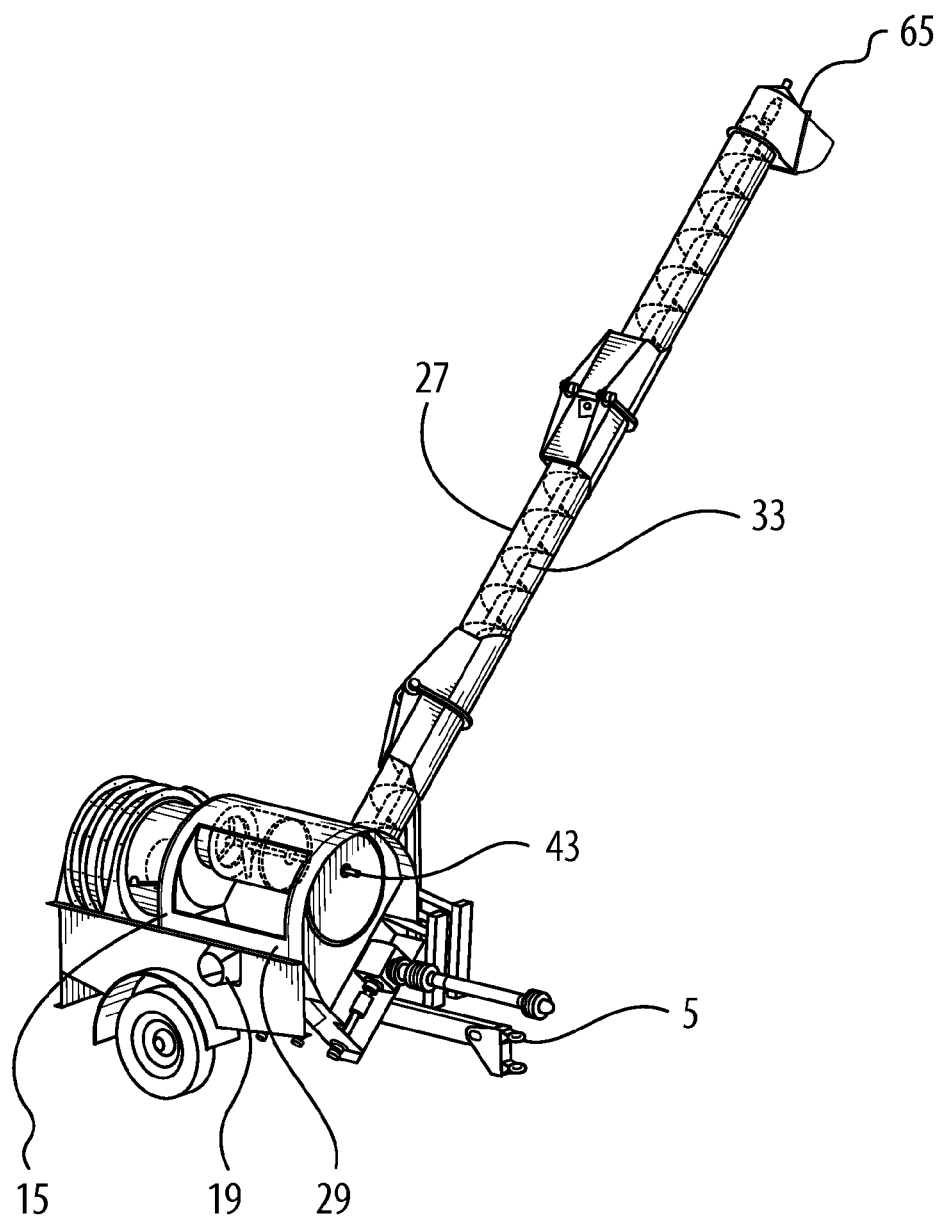
FIG. 4 is a front end elevational view of the embodiment of the bulk loader shown in FIG. 1.

As seen in FIGS. 4 and 7, an inlet 19 is located in sidewall 15 of the air-materials separating chamber 21, and is transformed from a generally rectangular configuration adjacent the sidewall 15 to a generally circular cross-section at its outermost end, as can plainly be seen in FIG. 4. In the preferred embodiment, as illustrated in FIG. 4, the inlet has a larger square cross-sectional area adjacent the sidewall than at the circular cross-section outermost end. As the air and particulates pass within the inlet 19, they are transferred from the entrance of the inlet (which in the preferred embodiment is of circular cross-section having a diameter of approximately 8 inches), to an area of the inlet having a larger cross-section (which in the preferred embodiment, is of square cross-section, being approximately 10 inches on each side), and accordingly lower pressure, the air and particulates being slowed as they move toward the larger cross-sectional area of the inlet adjacent the sidewall. The slowing of the air and particulates within the inlet 19 reduces the likelihood or extent of damage to the particulates as they enter and impact with the surfaces within the separating chamber and additionally provides an early stage for the separation of the particulates from the air stream.

At such outermost end, a conduit or hose (not shown) can be fixedly attached thereto in direct communication with the inlet 19 and is provided with a pickup nozzle (not shown) at its outer end for receiving particulate or granular materials to be handled by the loader 1, which are drawn through the inlet 19, into the air-materials separating chamber 21.

In the opposite sidewall 17 and disposed in a generally fore-and-aft alignment with the inlet 19 is an outlet 29, as shown in FIGS. 3 and 4, and extending upwardly along the sidewall 17 from the floor of the air-materials separating chamber 21. A channel-shaped housing 31 of elongated, trough-like configuration is affixed to the sidewall 17 outboard of the outlet 29 and in covering relationship therewith so as to house an elevating or discharging auger denoted by the numeral 33 in FIG. 4, which extends generally upwardly and outwardly at an incline from a point just below the floor of the air-materials separating chamber 21 to a remote outermost end spaced upwardly and outwardly above and away from the air-materials separating chamber 21. Preferably, a lower longitudinal portion of the channel-shaped housing 31 which adjoins the sidewall 17 is open along its length to facilitate the unimpeded reception and entry of particulate materials from the inlet 19 directly to the outlet 29 and into the auger assembly 27, as later described.

The auger 33 and the housing 31 form portions of what may be more broadly termed an auger assembly 27 (as seen in FIG. 4) which further includes an elongated tubular housing 35 leading upwardly and outwardly away from the lowermost housing 31 in open communication therewith, as seen in FIG. 1. The auger 33 is supported in coaxial relationship with the tubular housing 35 interiorly of the latter for moving particles upwardly and outwardly away from the body 7 to an awaiting truck or other location. It will be noted that the housing 35 is hinged at 37 (as seen in FIGS. 1 and 3) to enable an upper section 39 of tubular housing 35 to be folded back into overlapping relationship for roading purposes. Of course, the auger 33 is likewise constructed in sections so the entire auger assembly 27 is hingable at 37 for alternative disposition in either a transport condition (overlapping relationship, or overlapping relationship with the body 7) or the full line working condition seen in any one of FIGS. 1 to 6.

Figure 2:
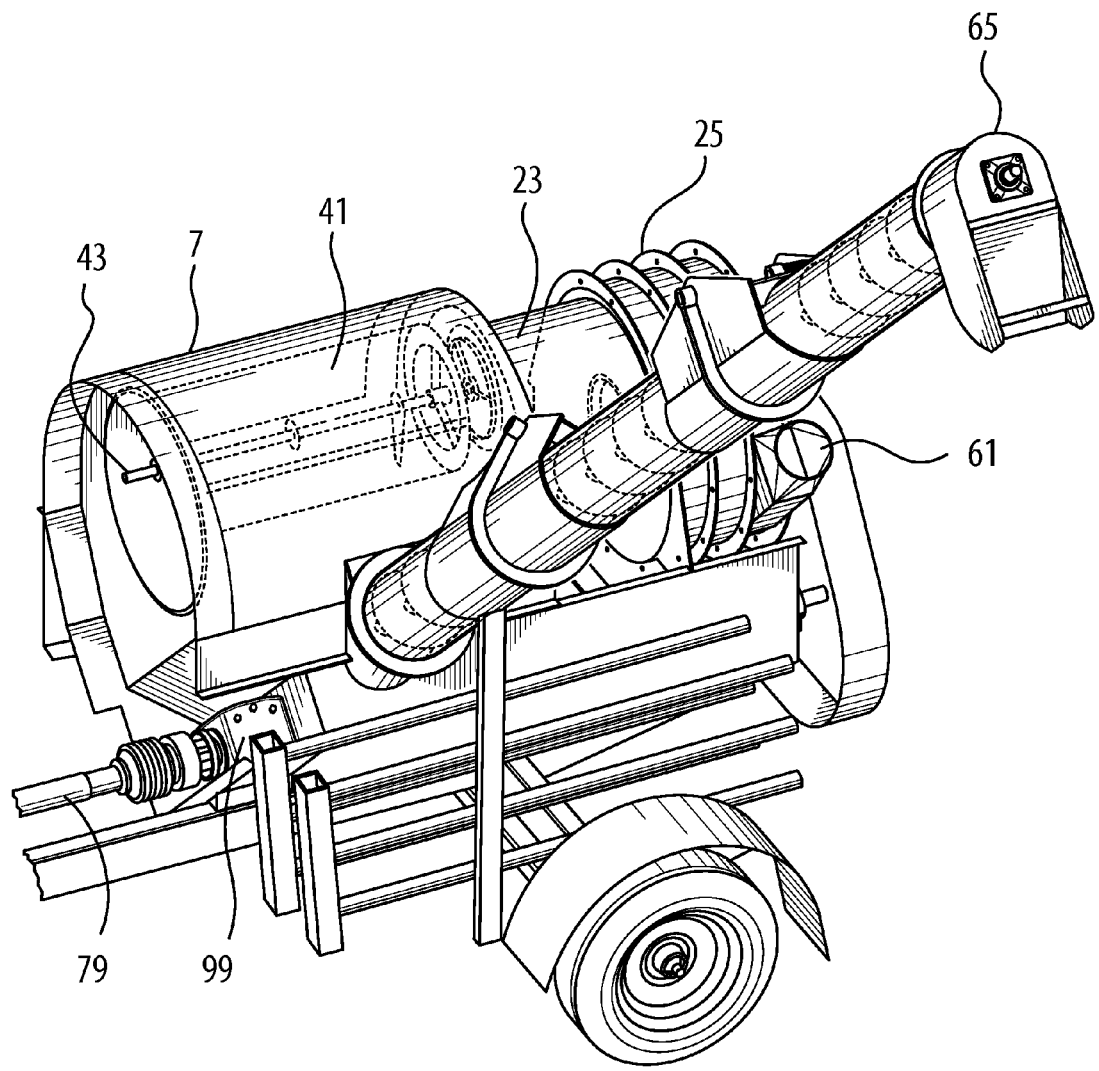
FIG. 2 is a left side elevational view of the embodiment of the bulk loader shown in FIG. 1.
Figure 5:
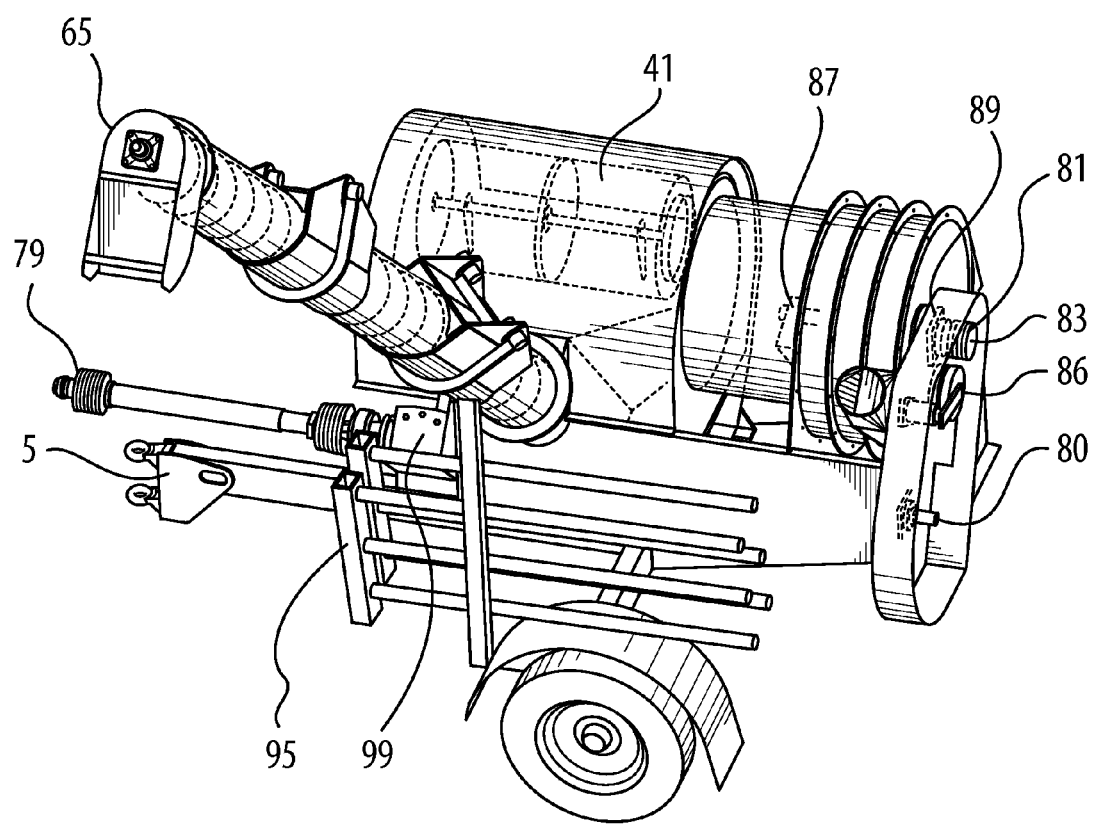
FIG. 5 is a left side elevational view of the embodiment of the bulk loader shown in FIG. 1.

Also disposed within the air-materials separating chamber 21 is a separating drum 41 of a generally perforated nature, as can be seen in FIGS. 2 and 5. The drum 41 is affixed to a fore-and-aft extending shaft 43 about whose axis the drum 41 is rotated during operation. Air drawn through the air-materials separating chamber 21 passes through the separating drum through small perforations therein, the separating drum's small perforations thereby separating the particulates from the air, leaving the particulates in the air-materials separating chamber 21 while the air which has passed through the perforations in the separating drum 41 is exhausted through the multi-stage suction mechanism as more fully described herein. An internal baffle 45 within and in close proximity to the drum 41 is suspended and free to remain in a generally stationary position relative to the air-materials separating chamber 21, functions to block the ingress of air into the lower peripheral portion of the drum 41 such that any light, adhering particles on the drum surface will drop therefrom as the periphery of the drum passes around the baffle 45.

Figure 8:
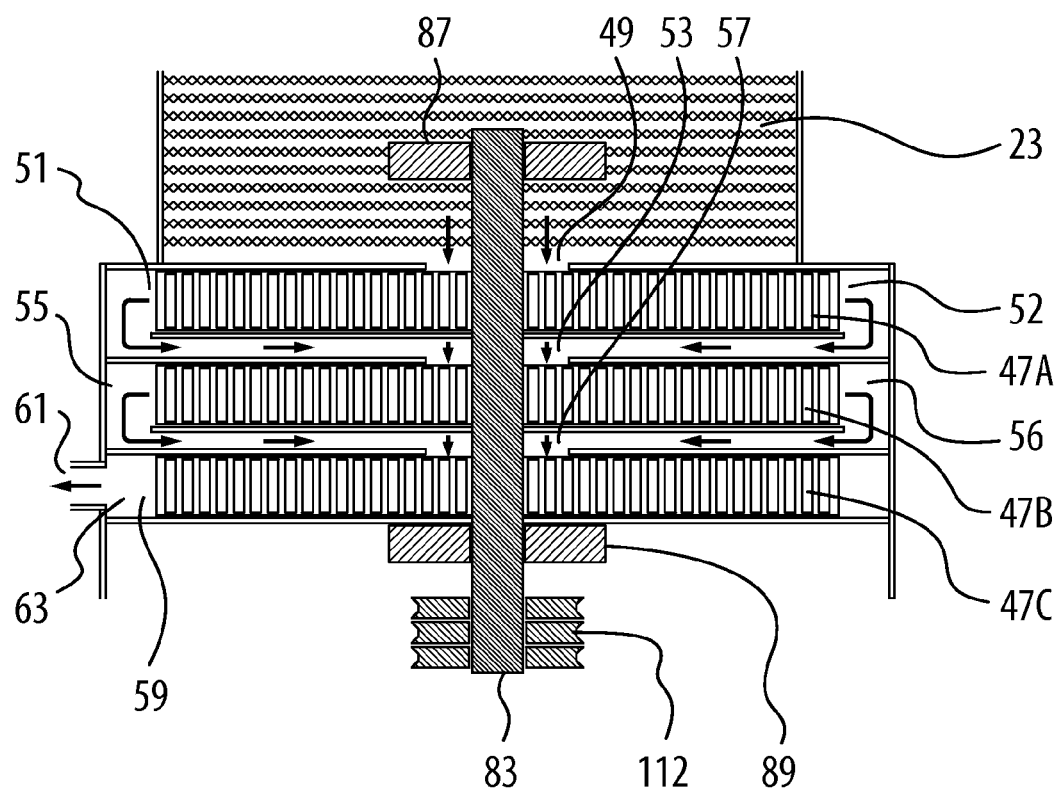
FIG. 8 is a schematic cutaway view of an alternative embodiment of the multi-stage suction mechanism utilized in the bulk loader of the present invention.
Figure 8A:
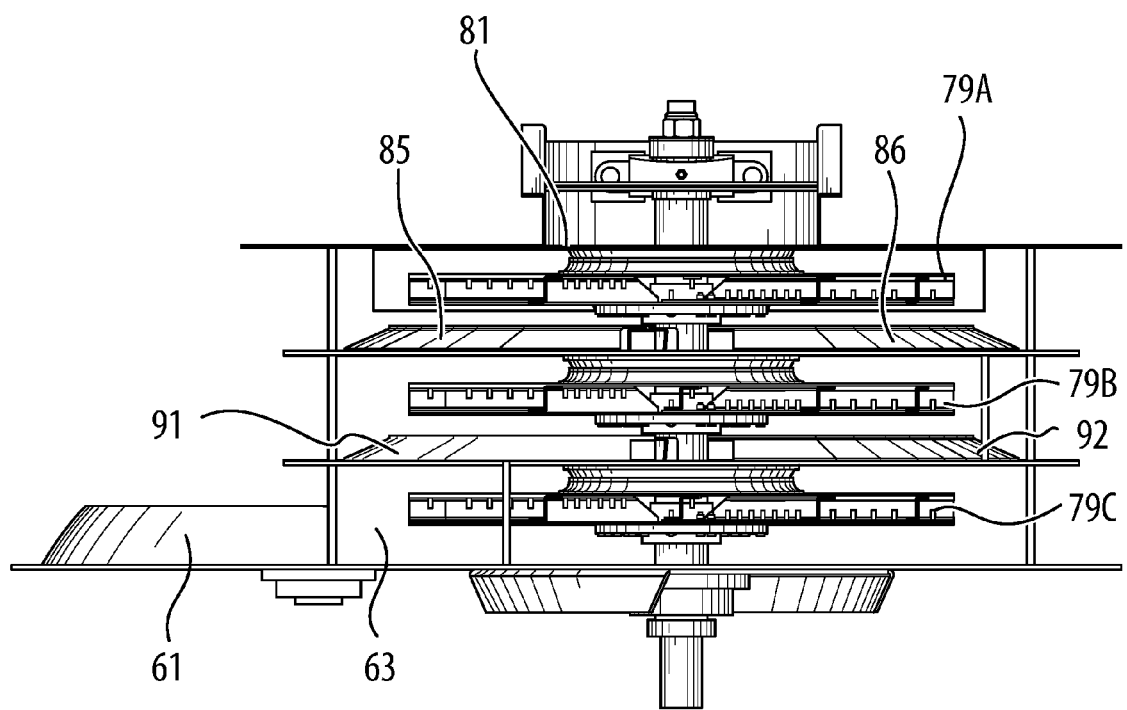
FIG. 8A is a cutaway view of a preferred embodiment of the multi-stage suction mechanism utilized in the bulk loader of the present invention.

In a preferred embodiment of the present invention, and as seen in FIG. 8A, the present invention utilizes a multi-stage suction mechanism 25 comprising at least two fan blowers, and preferably at least three fan blowers. In the embodiment of the present invention shown in FIG. 8A, three such fan blowers (79A, 79B, 79C) are connected together along blower shaft 83 and used in combination so as to create a higher negative pressure within the air material separating chamber and settling chamber, and thus achieve a much higher operational capacity for the particulate loader of the present invention. It is, of course, to be understood that, alternatively, two or more than three such fan blowers could also be utilized in combination, as would be apparent to one skilled in the art. For example, a singular blower may draw 75 psi of pressure, while utilizing at least two centrifugal blowers, connected together and in combination, will draw, for example, approximately 120-160 psi of vacuum pressure, drawing a powerful current of air and particulates to enter the hose (not shown) connected to the inlet and flow into the air-materials separating chamber.

As illustrated in FIG. 8A, a powerful current of air will be drawn through a hose (not shown) connected to inlet 19 by the negative pressure condition created by the fan blowers 79A, 79B,79C, connected in series to one another by means of blower shaft 83. Such air flow enters the inlet 19 in the body 7, passes through the perforations within the drum 41 in the air-materials separating chamber 21, and is drawn through the settling chamber 23, and enters through inlet 81 of blower 79A, where the air is then directed by blower 79A through stators 85, 86 to enter blower 79B, the air then being directed by blower 79B through stators 91, 92 to enter blower 79C, whereupon it is ultimately and eventually exhausted to the outside atmosphere through the exhaust 61 by way of fan chamber 63, the exhausted air, in one embodiment, passing through an exhaust structure, as hereinafter described, before passing to the outside atmosphere, to reduce noise and dust for the operator.

In an alternative embodiment, the present invention utilizes a multi-stage suction mechanism 25 comprising, preferably, at least two centrifugal blowers. In this alternative embodiment of the present invention, and as seen in FIG. 8, three such centrifugal blowers (47A, 47B and 47C) are connected together along blower shaft 83 and used in combination so as to create a higher negative pressure within the air material separating chamber 21 and settling chamber 23, and thus achieve a much higher operational capacity for the particulate loader of the present invention. It is, of course, to be understood that, alternatively, two or more than three such blowers could also be utilized in combination, as would be apparent to one skilled in the art.

As illustrated in FIG. 8, a powerful current of air will be drawn through a hose (not shown) connected to inlet 19 by the negative pressure condition created by the centrifugal blowers 47A, 47B, 47C, connected in series to one another along blower shaft 83. Such air flow enters the inlet 19 in the body 7, passes through the perforations within the drum 41 in the air-materials separating chamber 21, and is drawn through the settling chamber 23, and enters through inlet 49 of blower 47A, where the air is then forced through the outlets 51, 52 of blower 47A to enter blower 47B at inlet 53, the air then being forced through the outlets 55, 56 of blower 47B to enter inlet 57 of blower 47C. This air is then forced through the outlet 59 of blower 47C, whereupon it is ultimately and eventually exhausted to the outside atmosphere through the exhaust 61 by way of fan chamber 63, the exhausted air, in one embodiment, passing through an exhaust structure before passing to the outside atmosphere, to reduce noise and dust for the operator.

While it is possible that the blades or rotors of the blowers could be of the same size, number and pitch, it is also conceivable, in an alternative embodiment, that the blades of one or more of the blowers are of different size, number and pitch, in a manner known to a person skilled in the art.

In yet another alternative embodiment, one or more positive displacement pumps may be utilized in place of the fan or centrifugal blowers.

In the preferred embodiment, the blowers communicate with the interior of drum 41, the air-materials separating chamber 21, the settling chamber 23 and with the fan chamber 63 to operably draw a negative pressure within the drum 41, the air-materials separating chamber 21 and the settling chamber 23, to draw air initially through a hose (not shown) connected to inlet 19 and into the air-materials separating chamber 21. It will be noted that, in the preferred embodiment, the inlet 19 is located substantially below the axis of rotation of the drum 41 defined by the shaft 43 and, likewise, the outlet 29 is located substantially below the shaft 43. The drum is positioned in the upper portion of the separation chamber to maximize the usable separation capacity of the chamber.

Figure 10:
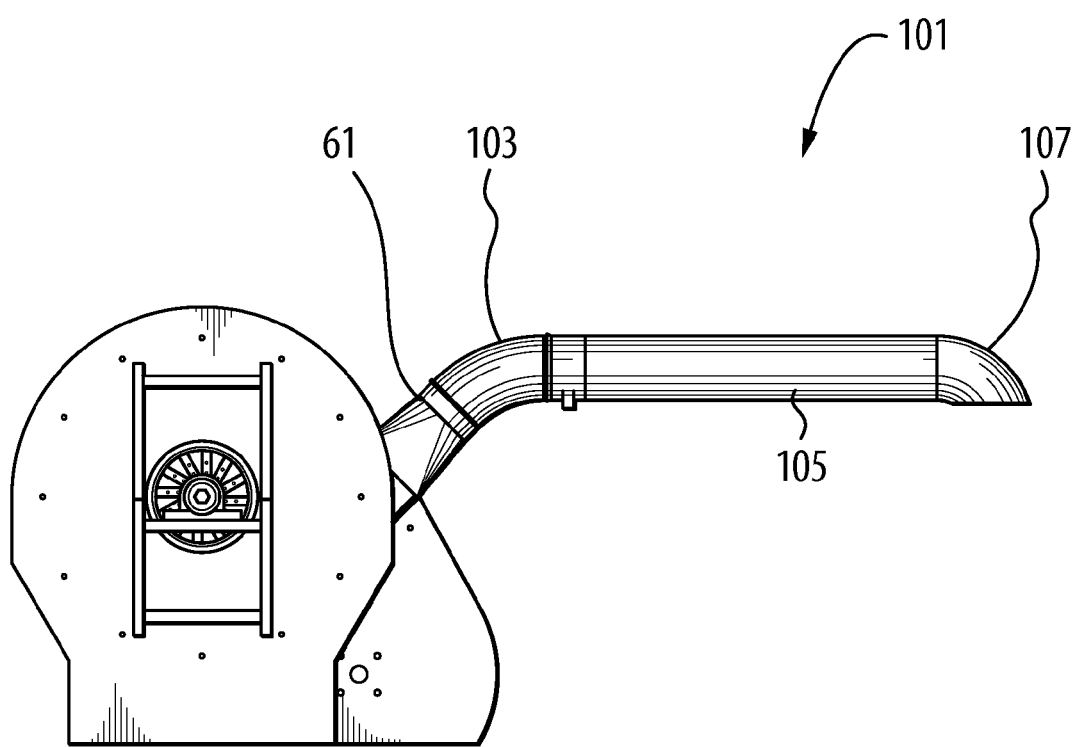
FIG. 10 is a rear view of one embodiment of an exhaust structure which can be utilized with the bulk loader of the present invention.
Figure 11:
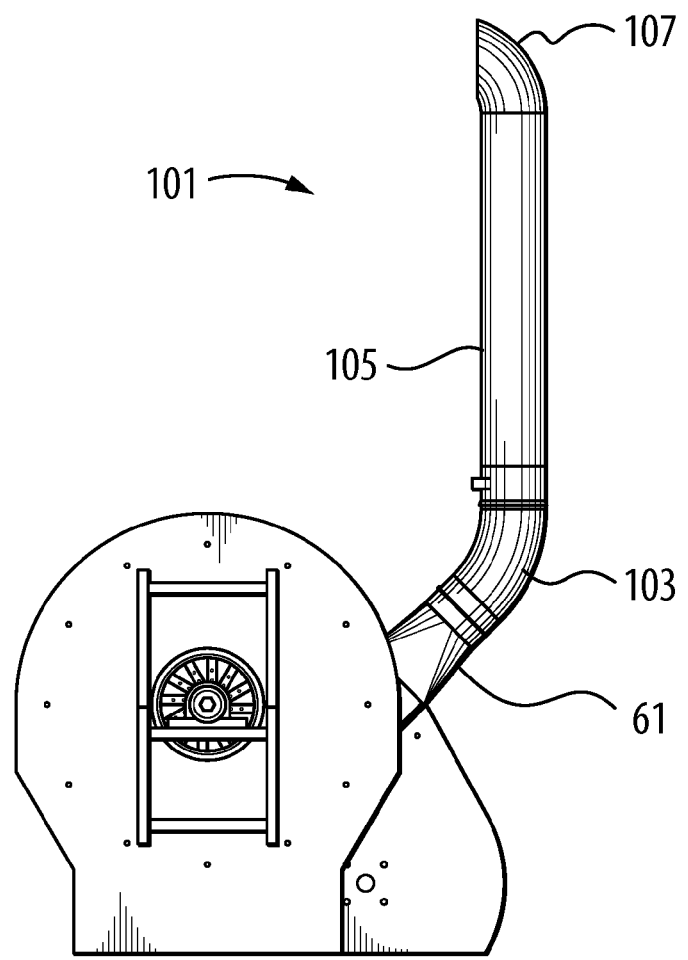
FIG. 11 is a rear view of another alternative embodiment of an exhaust structure which can be utilized with the bulk loader of the present invention.

In a preferred embodiment of the present invention, and as seen in FIGS. 10 and 11, an exhaust structure 101 is attached to exhaust 61. In the preferred embodiment, the exhaust 61 is substantially at a 45 degree angle to the horizontal, which, when a 45 degree first elbow portion 103 is attached thereto, permits the exhaust structure 101 to swivel or rotate in relation thereto, permitting the exhaust structure 101 to be directed vertically or horizontally as desired. Specifically, the exhaust structure 101 can be connected to exhaust 61 by means of a first elbow portion 103, to which an elongated length of tubular shaped pipe section 105 can be attached, connected or clamped thereto, in a manner known to a person skilled in the art. Preferably, this pipe section is between 3 feet and 6 feet in length. A second elbow portion 107 may then be attached, connected or clamped to an end of the of tubular shaped pipe section 105. In a preferred embodiment, these elbow portions 103, 107 can be pivoted, whereby air flow exiting through exhaust 61, and from the end of tubular shaped pipe section 105, can be directed in a desired manner, for example, substantially upwardly or outwardly. With reference to FIG. 10, such air flow exiting the loader will be directed outwardly and substantially horizontally by elbow portion 103, along a length of pipe section 105 and, ultimately, downwardly away from the loader by elbow portion 107. With reference to FIG. 11, such air flow exiting the loader will be directed generally upwardly by elbow portion 103, along pipe section 105 and then directed, by elbow portion 107, to exit over the loader. In this manner, the exhaust structure 101 can be utilized to direct dust exiting the loader to a desired location. Further, the exhaust structure 101, once connected to exhaust 61, also re-directs operational noise and sound connected with the operation of the blowers outwardly away from the loader, thus re-directing such noise away from the operator.

As noted previously, a settling chamber 23 is provided, this being, preferably, disposed between the air-materials separating chamber 21 and in the preferred embodiment of the multi-stage suction mechanism 25 (comprising blowers 79A, 79B, 79C) of the loader 1 of the present invention. The settling chamber 23 functions such that airflow is drawn by the blowers 79A, 79B, 79C through the air-materials separating chamber 21 into the settling chamber 23, which provides an area where dust, fine chaff or other particles from the suctioned particulate or granular materials, which may be present in the air flow, can settle, through gravity, on a surface of the settling chamber 23. This provides the benefit of reducing the clogging of the blowers 79A, 79B, 79C through an accumulated presence of such dust, fine chaff or other particles in the blowers. Further, this settling of the dust, fine chaff or other particles reduces rotor blade wear of the blowers 79A, 79B, 79C, thus prolonging the effective usable life span of the rotor blades. In a preferred embodiment, the settling chamber 23 has an access port (not shown) to permit the removal of the dust, fine chaff or other particles which have settled in the settling chamber 23. Alternatively, the settling chamber 23 itself may be removable to permit the removal of the dust, fine chaff or other particles which have settled in the settling chamber 23. In another embodiment, a cyclone separator (not shown) is positioned and installed within the settling chamber 23 to remove dust, fine chaff or other particles from the air stream flowing therethrough.

Figure 9:
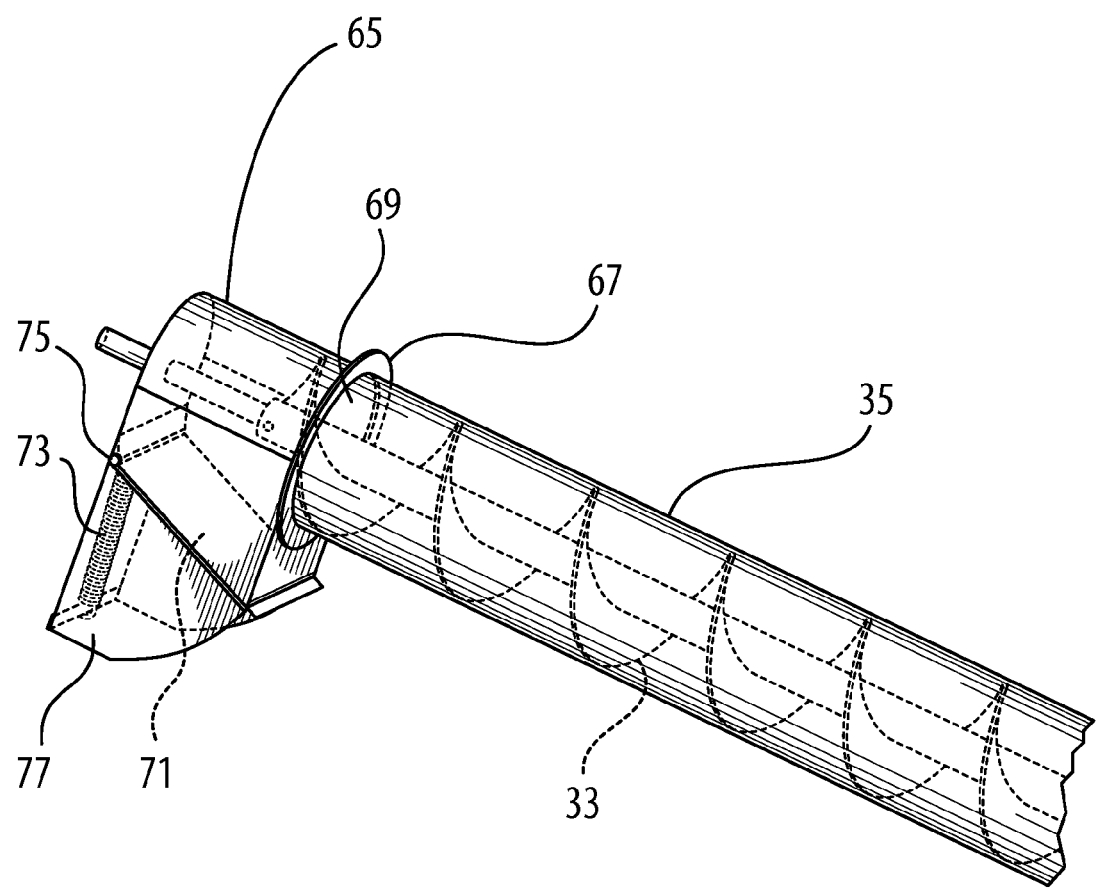
FIG. 9 is an enlarged fragmentary view of an embodiment of the end dump assembly utilized in the bulk loader of the present invention.
Figure 9A:
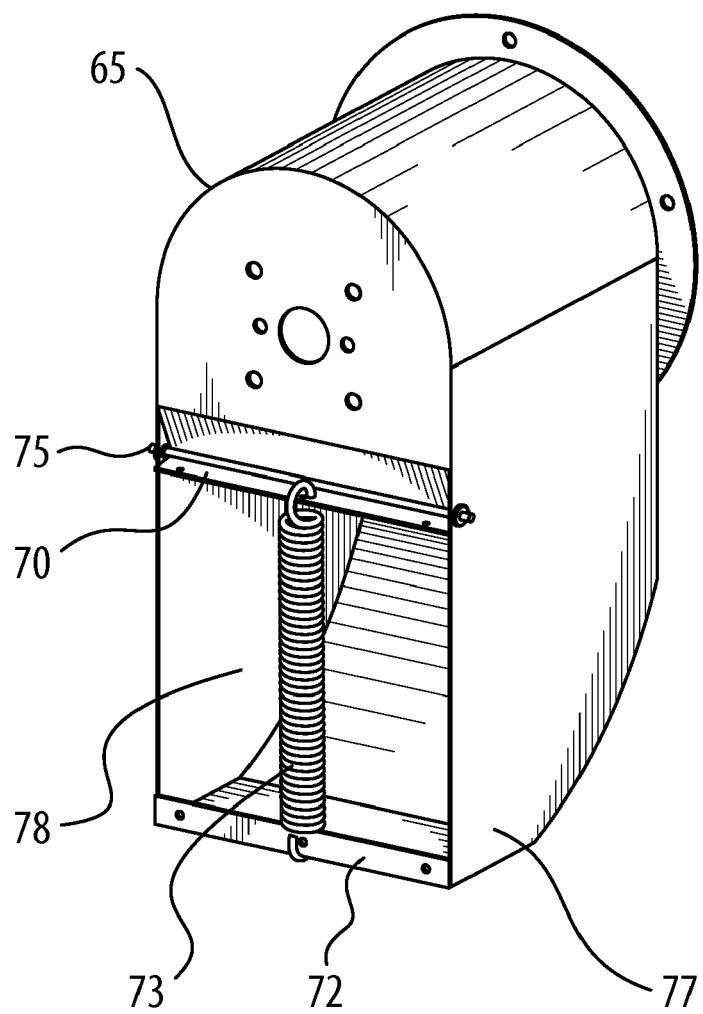
FIG. 9A is an enlarged rear perspective view of the embodiment of the end dump assembly shown in FIG. 9, and which is utilized in the bulk loader of the present invention.

FIGS. 9 and 9A illustrate an embodiment of a material-conveying end dump housing 65, (hereinafter referred to as a "housing"), which is adapted to cover the outer end 67 of the tubular housing 35. Thus, it will be appreciated that, when the housing has been attached to the outer end 67 of the tubular housing 35, the end of the auger assembly is contained substantially within the housing 65, as can be seen with reference to FIG. 9. In this manner, particulate materials advanced by the auger 33 out of the outermost end 67 of the tubular housing 35 will enter into the housing 65 for discharge, as hereinafter described.

In a preferred embodiment, particulate materials discharged by the auger assembly 27 out of the outer end 67 of the tubular housing 35, pass through an inlet port 69 in communication therewith, and accumulate within the housing 65 on an upper surface of a bottom wall 71 of the housing 65, the bottom wall 71 being hingedly connected 75 thereto, the bottom wall being generally held in the closed position by a spring 73 as described herein. The opening of the bottom wall 71 thus depends upon the weight of the material accumulating in the housing 65, and the load applied by the spring 73 to keep the bottom wall 71 closed. As material to be discharged will continue to accumulate in the housing until the weight of the accumulated material reaches that weight necessary to force open the bottom wall of the housing, whereupon the bottom wall 71 will swing to an open position thereby allowing the discharge of material from the housing to, for example, an awaiting truck or other receptacle. Of course, the force applied by the auger 33 in feeding material into a full housing will compress the material and force the bottom wall 71 open. As noted previously, the opening of the bottom wall 71 thus depends upon the weight of the material accumulating in the housing, and the counteracting force applied by the spring 73 to keep the bottom wall closed. When material is no longer being sent in sufficient amounts to maintain the bottom wall 71 in the open position, the spring 73 biases the bottom wall 71 back into a position to close the entrance to the housing 65. As seen in FIG. 9A, the spring 73 is connected between each of a rear portion 70 of the bottom wall, and bar 72, which extends laterally between side portions 77, 78 of the housing 65, thus exerting a constant tension force to keep the bottom wall closed, until the weight of the accumulated material in the housing 65 reaches that weight necessary to force open the bottom wall 71 of the housing 65, whereupon the bottom wall 71 will then pivot about the hinge 75 to an open position thereby allowing the discharge of material from the housing 65.

It will, of course, be apparent to a worker skilled in the art that the weight of the accumulated material necessary to force open the bottom wall of the housing can be varied, and depends upon, for example, the weight of the bottom wall and the resiliency of the spring which is utilized. Of course, once the spring 73 pivots the bottom wall 71 such as to close the housing 65, the closed housing blocks or impedes a substantial entry of outside air into the housing 65, and the attached tubular housing 35, thus limiting the loss of the negative pressure in the loader and in the auger assembly. In a preferred embodiment of the housing 65, side portions 77 of the housing 65 extend beyond the lower edges of the front and rear of the housing to provide extender walls alongside the opened or partially opened bottom wall, so that during the gravitational discharge of materials when the bottom wall 71 of the housing has opened, the extended side portions 77, in conjunction with and substantially abutting the opened or partially opened bottom wall 71, reduce the unimpeded entry of outside air into the housing 65 (and correspondingly attached tubular housing 35), thus inhibiting diminution of the negative pressure in the loader and in the auger assembly.

In the preferred embodiment, the drum 41 is driven by a belt (not shown), by way of pulleys mounted on the drive and on the shaft 43, and that such drives may be similar in most respects to the drives present in respect of prior commercialized machines, as understood to a person skilled in the art.

Figure 12:
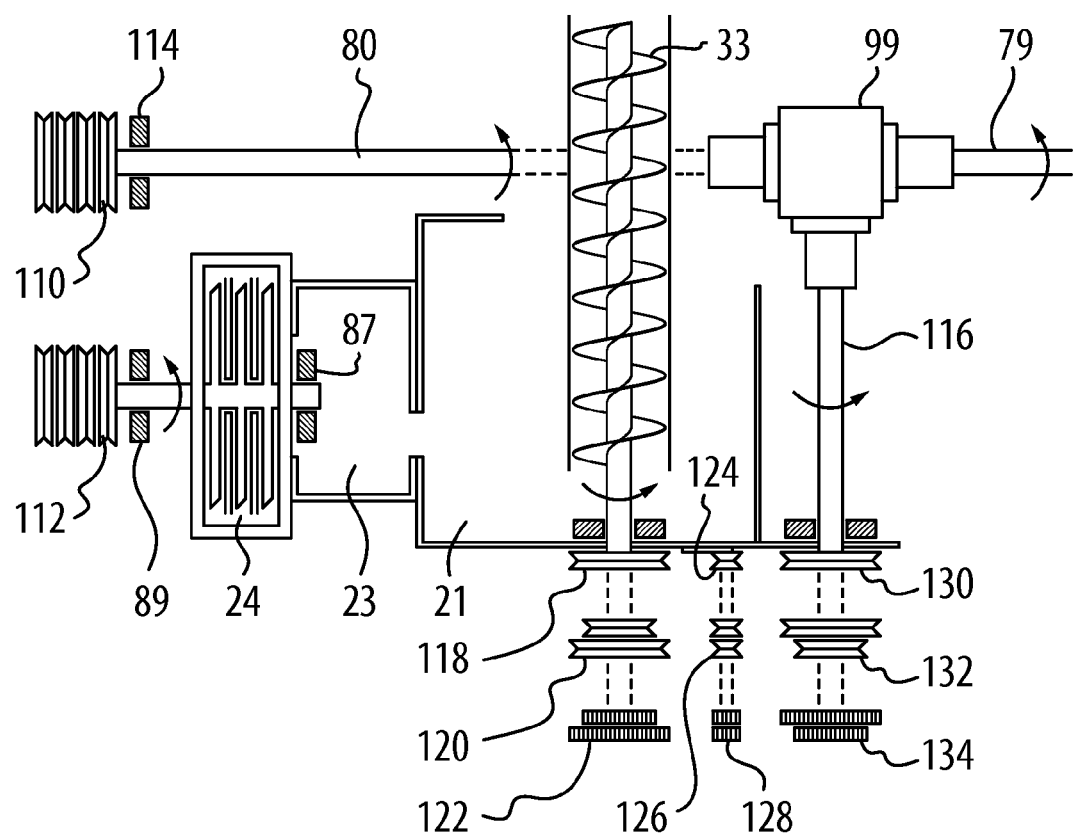
FIG. 12 is a schematic of the drive mechanism for the auger and blowers in accordance with an embodiment of the present invention.
Figure 13:
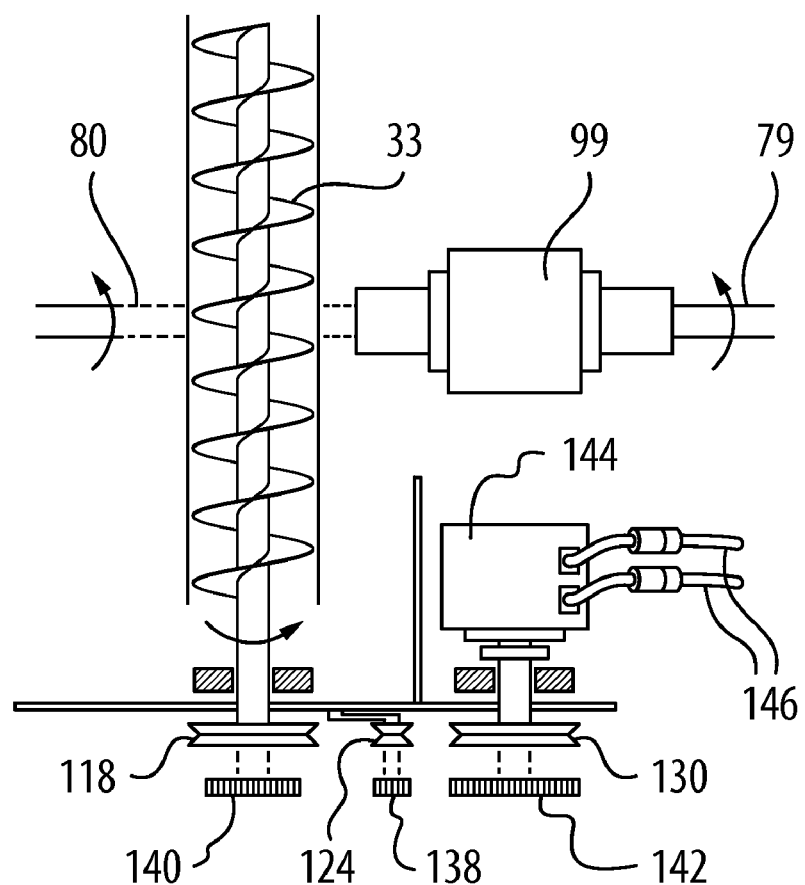
FIG. 13 is a schematic of the drive mechanism for the auger in accordance with an alternative embodiment of the present invention.

Referring to FIGS. 12 and 13, power from the front of the machine is delivered via a simple drive shaft such as the main drive shaft 79 connected at one end to, for example, the power take off of a tractor, and connected at the other end to a power transfer case 99 and thereafter a rearward power shaft 80. The rearward power shaft 80, by means of a single pulley or preferably a multi-pulley set 110 thereon, (or alternatively, a chain sprocket set (not shown)) provides power for the blowers 79A, 79B, 79C, by belts (or alternatively, where sprockets are utilized, by chain(s)), by way of a corresponding pulley or preferably multi-pulley set 112 (or a corresponding chain sprocket set in an alternative embodiment) attached to a blower drive shaft 81 upon which the blowers 79A, 79B, 79C are mounted. The rearward power shaft 80 and blower drive shaft 83 are rotationally supported by bearing sets 114, 87 and 89 respectively illustrated in FIGS. 5, 7 and 12. Tensioning for the belt and pulley mechanism can be effected through use of a tensioning or idler arm 86 as seen in FIGS. 5 and 7.

In the preferred embodiment, and as seen in FIGS. 1, 4, 5 and 12, the auger 33 is driven by means of a power transfer case 99, itself driven by the main drive shaft 79 in a manner known to a person skilled in the art, the power transfer case 99 transferring the power from the main drive shaft to, in the preferred embodiment, an intermediate shaft 116 which, as illustrated in FIGS. 1 and 4, extends on an angle downwardly away from the power transfer case 99. In the preferred embodiment, the angle of the intermediate shaft 116 to the horizontal corresponds with or substantially corresponds with the angle of the longitudinal axis of the auger 33 to the horizontal, such that the intermediate shaft 116 is parallel or substantially parallel with the longitudinal axis of the auger 33, thereby allowing the drive mechanism between the intermediate shaft 116 and the auger 33, more fully described herein, to be aligned or substantially with one another (it being understood that because in the preferred embodiment, the drive shaft 80 passes below the auger 33, the intermediate shaft, while parallel with and at the same angle to the horizontal as the longitudinal axis of the auger 33, it will be lower than the longitudinal axis of the auger as illustrated in FIG. 1, such that, the plane defined by the intermediate shaft and the longitudinal axis of the auger will be sloped downwardly both toward the front side and toward the right side of the loader. In an alternative embodiment where the drive shaft 80 passes above the auger 33, while the intermediate shaft will be parallel or substantially parallel with and at the same angle to the horizontal as the longitudinal axis of the auger, the plane defined by the intermediate shaft and the longitudinal axes of the auger will slope downwardly toward the right side of the loader, an upwardly toward the front of the auger.

In the preferred embodiment, as illustrated in FIG. 12, a pulley 130 is attached to the lower end of the intermediate shaft 116, and in alignment therewith, a pulley 118 is attached to the lower end of the auger 33, through which pulleys (and a suitable belt, not shown), rotational power is provided from the intermediate shaft to the auger to thereby drive the auger. In a manner known to a person skilled in the art, an idler pulley 124 is provided between the pulleys to maintain the proper tensioning in the belt. In an alternative embodiment (not illustrated), a pair of sprockets, a chain and an idler sprocket may be utilized in the place of the corresponding pair of pulleys, belt and idler pulley in a manner known to a person skilled in the art.

In some circumstances, it is desirable to vary the rotational speed of the auger relative to the rotational speed of the blowers. For example, when the loader is being used to move a large quantity of particulates a short distance, it may be desirable to reduce the suction effect of the loader by reducing the rotational speed of the blowers, while at the same time increasing the rotational speed of the auger. On the other hand, when the loader is being used to move smaller quantities of particulates over a long distance, it may be desirable to maintain maximum rotational speed of the blowers, while at the same time decreasing the rotational speed of the auger. In one embodiment of the present invention, the power transfer case includes a variable gearset for the auxiliary drive shaft so that the auxiliary drive shaft 116 can be operated at different rotational speeds relative to the rearward drive shaft 80. In another embodiment, as illustrated in FIG. 12, in the place of the single pulley 130 on the end of the intermediate shaft 116, two pulleys 132 of different diameters are provided, and similarly in the place of the single pulley 118 on the end of the auger 33, two pulleys 120 of different diameters are provided, the larger pulley on the intermediate shaft being aligned with the smaller pulley on the auger, and the smaller pulley on the intermediate shaft being aligned with the larger pulley on the auger so that the operator of the loader may install a single belt on either pair of aligned pulleys and in so doing thereby increase or decrease the relative rotational speed of the auger. An idler pulley 126 may be utilized to maintain proper tension in the belt. In a further alternative embodiment illustrated in FIG. 12, in the place of the single pulley 130 on the end of the intermediate shaft 116, two sprockets 134 of different diameters are provided, and similarly in the place of the single pulley 118 on the end of the auger 33, two sprockets 122 of different diameters are provided, the larger sprocket on the intermediate shaft being aligned with the smaller sprocket on the auger, and the smaller sprocket on the intermediate shaft being aligned with the larger sprocket on the auger so that the operator of the loader may install a single chain on either pair of aligned sprockets and in so doing thereby increase or decrease the relative rotational speed of the auger. An idler sprocket 128 may be utilized to maintain proper tension in the chain. In a further embodiment illustrated in FIG. 13, the power to drive the auger is not provided by way of the power transfer case but rather by way of a variable speed hydraulic motor 144 attached to a pulley 130 aligned with a corresponding pulley 118 on the auger shaft, or alternatively the hydraulic motor 144 is attached to a sprocket 142 aligned with a corresponding sprocket 140 on the auger shaft, a belt (or in the case of the sprockets, a chain, not shown) on the pulley 130 (or sprocket 142) attached to the hydraulic motor 144 driving the auger by means of the auger pulley 118 (or sprocket 140). A pulley 124 or sprocket 138 idler is provided to maintain proper belt or chain tension. Power for the hydraulic motor is provided through hydraulic hoses 146 by means of a hydraulic pump such as found on a typical farm tractor. The rotational speed of the hydraulic motor may be varied as desired in a manner known to a person skilled in the art, to provide a wide range of rotational speeds for the auger, independent of the rotational speed of the blowers. In an alternative embodiment, a sensor (not shown) adapted to detect the height of the grain or other particulates positioned within the separation chamber (or alternatively, adapted to detect the rate of introduction of grain or other particulates into the separation chamber), will trigger or engage a switch or relay while detecting a predetermined height of grain (or other particulates) positioned within the separation chamber (or a predetermined rate of introduction of grain or other particulates into the separation chamber, as the case may be), which switch or relay will, when triggered or engaged, activate a hydraulic fluid valve (not shown) to increase the flow of hydraulic fluid within the hydraulic motor 144 in a manner known to a person skilled in the art, the increased flow of hydraulic fluid within the hydraulic motor 144 increasing the rotational speed of the auger to more rapidly transfer the grain from the separation chamber, by means of the auger, into an awaiting truck, vehicle or other storage location. When the sensor no longer detects that the height of the grain (or other particulates) within the separation chamber is above a predetermined height (or no longer detects the predetermined rate of introduction of grain or other particulars into the separation chamber) the switch or relay will activate the hydraulic fluid valve to reduce the flow of hydraulic fluid within the hydraulic motor 144 in a manner known to a person skilled in the art, the reduced flow of hydraulic fluid within the hydraulic motor 144 reducing the rotational speed of the auger to more slowly transfer the grain from the separation chamber.

Figure 6:
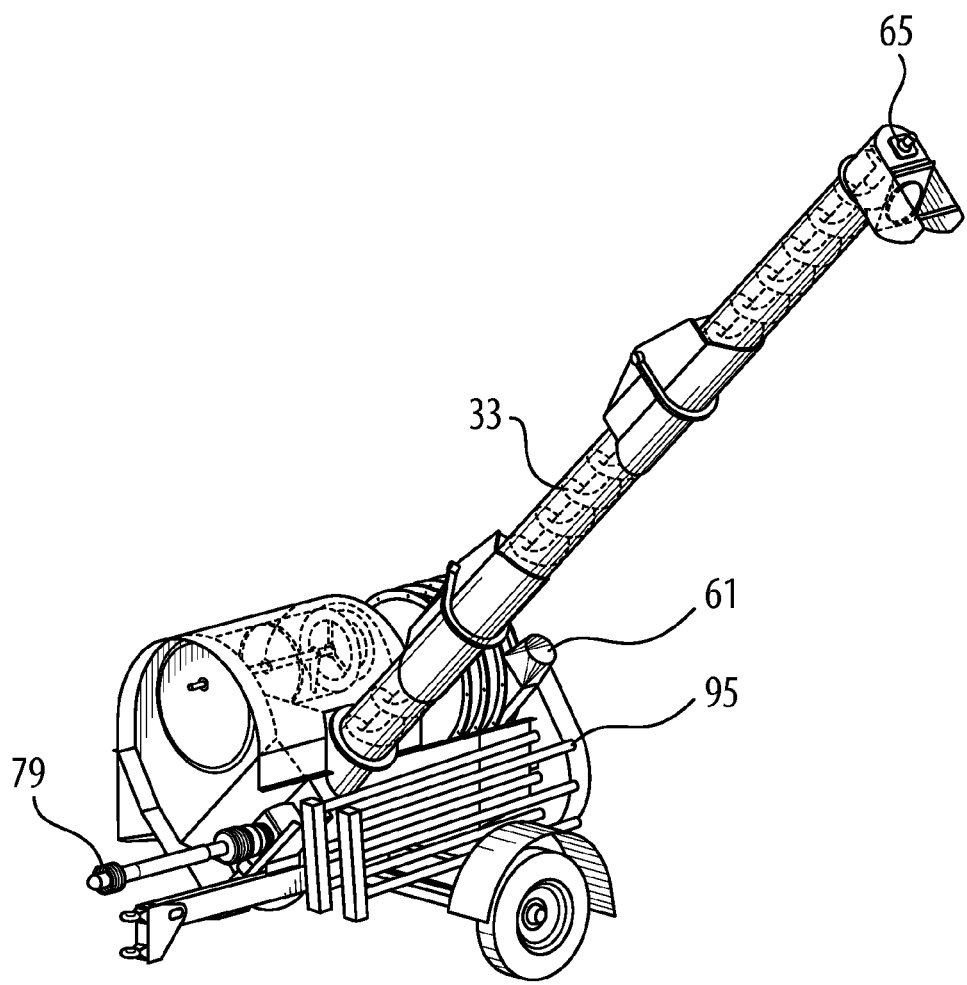
FIG. 6 is a front left side elevational view of the embodiment of the bulk loader shown in FIG. 1.

In a further embodiment of the present invention, and as seen in FIG. 6, the loader 1 of the present invention may also comprise a hose storage rack 95, whereby the hose (not shown) for connection to the inlet 19 can be conveniently stored when not in use.

Operation

When the loader 1 is towed to the desired work site the auger assembly 27 is unfolded and the hose (not shown) connected to inlet 19, a drive shaft 79 is coupled with the power takeoff shaft (not shown) of a tractor or other vehicle or device for activation of the blowers 79A, 79B, 79C, the drum 41, and the auger 33. As noted previously, in a preferred embodiment, a powerful current of air will be drawn through a hose (not shown) connected to inlet 19 by the negative pressure condition created by the fan blowers 79A, 79B, 79C, connected in combination. Such air flow enters through inlet 81 of blower 79A, where the air is then directed by stators 85, 86 through the blower 79B and further re-directed by stators 91, 92 to enter blower 79C, whereupon it is ultimately and eventually exhausted to the outside atmosphere through exhaust structure 101 by way of fan chamber 63.

Inside the air-material separating chamber 21, any particles that do become adhered to the drum 41, including not only the grain itself but lighter chaff particles and the like, will drop off as they rotate with the drum past the baffle 45.

The auger assembly 27 advances the materials received by inlet 29 upwardly and outwardly away from the body 7 toward the outermost end 67 of the tubular housing 35 to enter into the end dump housing 65 for discharge. As the augered materials to be discharged continue to accumulate in the housing, until the weight of the accumulated material reaches that weight necessary to force open the bottom wall 71 of the housing 65, the bottom wall 71 will swing to an open position, thereby allowing the discharge of material from the housing to, for example, an awaiting truck or other receptacle, as previously described. Of course, the bottom wall 71 of the housing may also be assisted in opening by the auger feeding more material into an already full housing, whereby the material is thus compressed so as to, eventually, force the bottom wall 71 open.

The present invention has been described herein with regard to preferred embodiments. However, it will be obvious to persons skilled in the art that a number of variations and modifications can be made without departing from the scope of the invention as described herein.

What is claimed is:

1. A high capacity bulk loader and transfer apparatus for particulate materials comprising:
   a. a first air-materials separating chamber;
   b. an inlet into the first air-materials separating chamber;
   c. a first outlet from the first air-materials separating chamber;
   d. a second outlet from the first air-materials separating chamber;
   e. a multi-stage suction mechanism having an inlet and an exhaust outlet, the inlet of the multi-stage suction mechanism being in communication with the first outlet from the first air-materials separating chamber for drawing a high powered air stream through the inlet of the first air-materials separating chamber and into the first air-materials separating chamber, to entrain the materials and propel them through the inlet into the first air-materials separating chamber;
   f. first separating means within the first air-materials separating chamber for restricting the passage of particulate materials to the multi-stage suction mechanism while allowing the passage of air from the first air-materials separating chamber to the multi-stage suction mechanism; and
   g. a discharge conveyor operably coupled with the second outlet from the first air-materials separating chamber and adapted to allow the continuous transfer of particulate materials from the second outlet from the first air-materials separating chamber to a remote location.

2. The high capacity bulk loader and transfer apparatus according to claim 1, further comprising means for sealing the discharge conveyor at a discharge end thereof against substantial entry of ambient air during operation of the discharge conveyor and the multi-stage suction mechanism.

3. The high capacity bulk loader and transfer apparatus according to claim 1, wherein the discharge conveyor is a rotary auger.

4. The high capacity bulk loader and transfer apparatus according to claim 1, wherein a second air-materials separating chamber is provided having an inlet and an outlet, the inlet of the second air-materials separating chamber being in communication with the first outlet from the first air-materials separating chamber and the outlet of the second air-materials separating chamber being in communication with the inlet for the multi-stage suction mechanism.

5. The high capacity bulk loader and transfer apparatus according to claim 1, wherein a second separating means is provided within the second air-materials separating chamber for restricting the passage of particulate materials to the multi-stage suction mechanism while allowing the passage of air from the second air-materials separating chamber to the multi-stage suction mechanism.

6. The high capacity bulk loader and transfer apparatus of claim 5, wherein the second separating means comprises a cyclone separator adapted to substantially inhibit dust, fine chaff or other particles from being transported to the multi-stage suction mechanism.

7. The high capacity bulk loader and transfer apparatus of claim 1, wherein the multi-stage suction mechanism comprises at least two blowers.

8. The high capacity bulk loader and transfer apparatus of claim 7, wherein the at least two blowers are fan blowers.

9. The high capacity bulk loader and transfer apparatus of claim 7, wherein the at least two blowers are centrifugal blowers.

10. The high capacity bulk loader and transfer apparatus of claim 7, wherein the at least two blowers are arranged in series.

11. The high capacity bulk loader and transfer apparatus of claim 10, wherein the at least two blowers are operably connected to one another.

12. The high capacity bulk loader and transfer apparatus of claim 1, wherein the multi-stage suction mechanism comprises at least two positive displacement pumps.

13. The high capacity bulk loader and transfer apparatus of claim 12, wherein the at least two positive displacement pumps are operably connected to one another.

14. The high capacity bulk loader and transfer apparatus of claim 1, wherein the first separating means comprises a rotatable drum having perforations therein to allow air to pass therethrough while substantially restricting the passage of particulate materials therethrough.

15. The high capacity bulk loader and transfer apparatus of claim 1, wherein the inlet into the first air-materials separating chamber further comprises a circular outermost end and a base end proximal to the sidewall, the base end having a larger cross-sectional area than a cross sectional area at the circular outermost end.

16. The high capacity bulk loader and transfer apparatus claim 1, wherein the speed of the discharge conveyor is adapted to be varied relative to the speed of the multi-stage suction mechanism.

17. A high capacity bulk loader and transfer apparatus for particulate materials comprising:

a. a first air-materials separating chamber;
b. an inlet into the first air-materials separating chamber;
c. a first outlet from the first air-materials separating chamber;
d. a second outlet from the first air-materials separating chamber;
e. a positive displacement pump having an inlet and an exhaust outlet, the inlet of the positive displacement pump being in communication with the first outlet from the first air-materials separating chamber for drawing a high powered air stream through the inlet of the first air-materials separating chamber and into the first air-materials separating chamber, to entrain the materials and propel them through the inlet into the first air-materials separating chamber;
f. first separating means within the first air-materials separating chamber for restricting the passage of particulate materials to the positive displacement pump while allowing the passage of air from the first air-materials separating chamber to the positive displacement pump; and
g. a conveyor operably coupled with the second outlet from the first air-materials separating chamber and adapted to allow the continuous transfer of particulate materials from the second outlet from the first air-materials separating chamber to a remote location.

* * * * *